(12) United States Patent
Kurosawa

(10) Patent No.: US 12,036,605 B2
(45) Date of Patent: Jul. 16, 2024

(54) MANUFACTURING ADDITIVELY MANUFACTURED ARTICLE, AND ADDITIVELY MANUFACTURED ARTICLE

(71) Applicant: KOBE STEEL, LTD., Hyogo (JP)

(72) Inventor: Eisuke Kurosawa, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 186 days.

(21) Appl. No.: 17/906,037

(22) PCT Filed: Feb. 17, 2021

(86) PCT No.: PCT/JP2021/006010
§ 371 (c)(1),
(2) Date: Apr. 5, 2023

(87) PCT Pub. No.: WO2021/182050
PCT Pub. Date: Sep. 16, 2021

(65) Prior Publication Data
US 2023/0226612 A1    Jul. 20, 2023

(30) Foreign Application Priority Data
Mar. 12, 2020   (JP) .................. 2020-043356

(51) Int. Cl.
*B22F 10/366*     (2021.01)
*B22F 10/28*      (2021.01)
(Continued)

(52) U.S. Cl.
CPC ............ *B22F 10/366* (2021.01); *B22F 10/28* (2021.01); *B23K 26/342* (2015.10); *B33Y 10/00* (2014.12);
(Continued)

(58) Field of Classification Search
None
See application file for complete search history.

(56) References Cited

U.S. PATENT DOCUMENTS 3,779,720 A * 12/1973 Ellis .................... C23C 4/06
428/653
3,998,318 A * 12/1976 McAlarney ......... B29C 48/2564
428/592
(Continued)

FOREIGN PATENT DOCUMENTS

JP   2013-501630 A   1/2013
JP   2018-171644 A   11/2018

OTHER PUBLICATIONS

International Search Report issued in PCT/JP2021/006010; mailed May 11, 2021.

*Primary Examiner* — Seth Dumbris
(74) *Attorney, Agent, or Firm* — Studebaker & Brackett PC

(57) ABSTRACT

A method for manufacturing an additively manufactured article, the method comprising subjecting a powder material comprising a first powder containing a precipitation hardening stainless steel and a second powder containing titanium carbide to weaving irradiation with a laser beam to melt and solidify the powder material, thereby laminating at least one hardened clad layer on a base material. In the step for laminating the clad layer, the following requirements are satisfied: $20 \leq A \leq 35$, $1.1 \leq B \leq 1.3$, and (40% by mass)$\leq R2 \leq$ (65% by mass). In the formulae, A represents a laser heat input index, B represents a powder feeding rate index, and R2 represents a content ratio of the second powder in the powder material.

5 Claims, 10 Drawing Sheets

(51) Int. Cl.
  *B23K 26/342* (2014.01)
  *B33Y 10/00* (2015.01)
  *B33Y 50/02* (2015.01)
  *B33Y 70/10* (2020.01)
  *B33Y 80/00* (2015.01)
  *B23K 103/04* (2006.01)

(52) U.S. Cl.
  CPC .............. *B33Y 50/02* (2014.12); *B33Y 70/10* (2020.01); *B33Y 80/00* (2014.12); *B23K 2103/05* (2018.08)

(56) References Cited

U.S. PATENT DOCUMENTS

| | | | | |
|---|---|---|---|---|
| 4,173,471 | A * | 11/1979 | Mal | C22C 38/30 75/243 |
| 2005/0067064 | A1 * | 3/2005 | Babu | B23K 35/0255 148/565 |
| 2011/0031222 | A1 | 2/2011 | Branagan et al. | |
| 2016/0067778 | A1 * | 3/2016 | Liu | B22F 12/49 425/162 |
| 2018/0236612 | A1 | 8/2018 | Cui et al. | |
| 2020/0368816 | A1 * | 11/2020 | Heikkinen | B33Y 10/00 |

* cited by examiner

FIG. 7

MANUFACTURING ADDITIVELY MANUFACTURED ARTICLE, AND ADDITIVELY MANUFACTURED ARTICLE

TECHNICAL FIELD

The present invention relates to a method for manufacturing an additively-manufactured object and an additively-manufactured object.

BACKGROUND ART

In general, in order to manufacture a component required to have wear resistance, a method is adopted in which cladding of a material having excellent wear resistance (high hardness) is performed on the surface by welding or thermal spraying, or the entire component is molded from a powdered material satisfying required properties by powder sintering (metallic molding+HIP or the like) or additive manufacturing. In addition, a method is also employed in which a powder sintered body is formed, and then the powder sintered body is joined to a surface of the component by diffusion joining, brazing, or the like.

For example, a material including a metal, a ceramic, or a cermet is used as a component that is required to have such wear resistance. In the case of performing surface cladding, and molding and additive manufacturing of these materials, avoidance of cracks during processing is particularly an issue, in addition to ensuring the joining strength with the base metal and the cladding layer density. In order to increase the life of a target component, it is desirable to form a cladding layer having a hardness as high as possible and a thickness as large as possible (on the order of several millimeters). However, as the hardness and the thickness are increased, cracks are likely to occur during processing. Therefore, it is required to form the above-described cladding layer by a highly economical method without being subjected to dimensional restrictions of a portion to be processed.

For example, Patent Literature 1 describes a technique for forming a cladding layer by tungsten inert gas (TIG) welding using a filler metal in which a ceramic reinforcing material is contained in a high-hardness Ni-based alloy.

Patent Literature 2 describes a technique for forming an overlay having a relatively high hardness by adding a powder containing a boron carbide phase on a Fe-based base in overlay welding of a Fe-based wire based on submerged arc welding (SAW) or gas metal arc welding (GMAW). Examples of Patent Literature 2 show a result of forming a cladding layer having a Rockwell C hardness of HRc 60 or more, and the hardness rises to around HRc 70 depending on the type of alloy.

CITATION LIST

Patent Literature

Patent Literature 1: JP-A-2018-171644
Patent Literature 2: JP-T-2013-501630

SUMMARY OF INVENTION

Technical Problem

However, in the case of Patent Literature 1, in addition to the improvement of weldability, the hardness of the formed cladding layer also rises, but only the hardness around HRc 50 is obtained in the vicinity of a surface of the cladding layer. In addition, a filler metal having high special properties is required.

In the case of Patent Literature 2, in the SAW, it is generally necessary to perform welding in a state in which a flux layer is laid on a side to be welded, and a scale of equipment is large, and the SAW is not suitable for overlay welding of small and medium-sized components. In addition, a construction process is also complicated. In Examples using GMAW, since the number of cracks in a manufactured welding test piece is evaluated, it is considered that it is difficult to form a cladding layer having a hardness of HRc 60 or more without causing weld cracks by the same method.

In general, some of commercially available products of surface hardened alloys (for example, Stellite alloys ("Stellite" is a registered trademark) manufactured by Kennametal Stellite) and Colmonoy alloys (("Colmonoy" is a registered trademark) manufactured by Wall Colmonoy Co., Ltd.) have a hardness range of HRc 60 or more (~ about HRc 64). However, these materials have high special properties, and it is often difficult to set appropriate welding conditions. In addition, in the high-velocity oxygen-fuel (HVOF) spraying using a cemented tungsten based powder, a layer around HRc 70 may be obtained by a part of the material, but in the case of HVOF, there is a problem that the formed hardened layer is thin (less than 1 mm), and the density and the adhesion to the base metal are low as compared with welding.

Accordingly, an object of the present invention is to provide a method for manufacturing an additively-manufactured object, by which a cladding layer having a high hardness and a thickness on the order of several millimeters in one pass can be formed without causing weld cracks, and surfacing can be stably performed with a high economic efficiency without being subjected to dimensional restriction, and an additively-manufactured object.

Solution to Problem

The present invention has the following configuration.
(1) A method for manufacturing an additively-manufactured object, the method including:
radiating a laser beam in a weaving manner to a powdered material containing a first powder containing precipitation hardening stainless steel and a second powder containing titanium carbide to melt and solidify the powdered material; and
depositing at least one layer of a cladding layer on a base metal,
wherein the step of depositing the cladding layer is a step satisfying the following conditional expressions [1], [2], and [3]:

$$20 \leq A \leq 35 \quad \text{Conditional Expression [1];}$$

$$1.1 \leq B \leq 1.3 \quad \text{Conditional Expression [2]; and}$$

$$40 \text{ mass \%} \leq R2 \leq 65 \text{ mass \%} \quad \text{Conditional Expression [3], where}$$

$A=P\times\alpha/\beta$ [kJ/cm]: Laser heat input index,
$B=Q\times\alpha/\beta$ [g/cm]: Powder feeding rate index,
P [W]: Heat input from laser beam,
Q [g/min]: Feeding rate of powdered material,
$\alpha=W/V1$,
$\beta=V2\times t$,
W [cm]: Scanning width of beam spot caused by weaving operation, V1 [cm/min]: Scanning speed of laser beam caused by weaving operation, V2 [cm/min]: Advancing speed in welding direction, t [sec]: Time of one weaving cycle, and R2 [mass %]: Ratio of second powder contained in powdered material.

(2) An additively-manufactured object including:

a base metal; and at least one layer of a cladding layer formed on the base metal, the cladding layer containing a precipitation hardening stainless steel alloy and titanium carbide, wherein the cladding layer has a thickness of 3 mm or more and 5 mm or less per layer, and a Rockwell C hardness of HRc 60 or more and HRc 65 or less, and an occupied area ratio R1 of a titanium carbide region in a structure observation image of the cladding layer is 50 area % or more and 65 area % or less.

Advantageous Effects of Invention

According to the present invention, a cladding layer having high hardness and a thickness on the order of several millimeters in one pass can be formed without causing weld cracks. In addition, surfacing can be stably performed with a high economic efficiency without being subjected to dimensional restrictions.

BRIEF DESCRIPTION OF DRAWINGS

FIG. 7 is an illustration view showing a structure observation image (upper part) and a binarized image (lower part) of a cladding layer in Test Examples 2-1~3.

DESCRIPTION OF EMBODIMENTS

Hereinafter, an embodiment of the present invention is described in detail with reference to the drawings.

A method for manufacturing an additively-manufactured object according to the present invention includes feeding a powdered material obtained by mixing a first powder containing a stainless steel powder and a second powder containing titanium carbide (TiC) onto a base metal, radiating a laser beam in a weaving manner to the fed powdered material, and depositing at least one hardened cladding layer, obtained by melting and solidifying the powdered material, on the base metal.

As will be described in detail later, when the hardened cladding layer is deposited, a cladding layer having a thickness on the order of several millimeters in one pass can be stably formed with high hardness without causing weld cracks. Here, one pass means one scanning path of the laser beam.

In the following description, an example in which a powdered material for forming a hardened cladding layer is melted using laser metal deposition (LMD) will be described, but the method for manufacturing the present additively-manufactured object is not limited to this example. For example, the present invention can be preferably applied to laser additive manufacturing (LAM), direct metal laser welding (DMLS), or the like. In particular, since a workpiece is welded using a welding robot in the case of laser metal deposition, there is an advantage that the degree of freedom in a shape of an additively-manufactured object can be improved as compared with a case where a workpiece is processed in a chamber.

[Laser Metal Deposition Apparatus]

Figure 1:
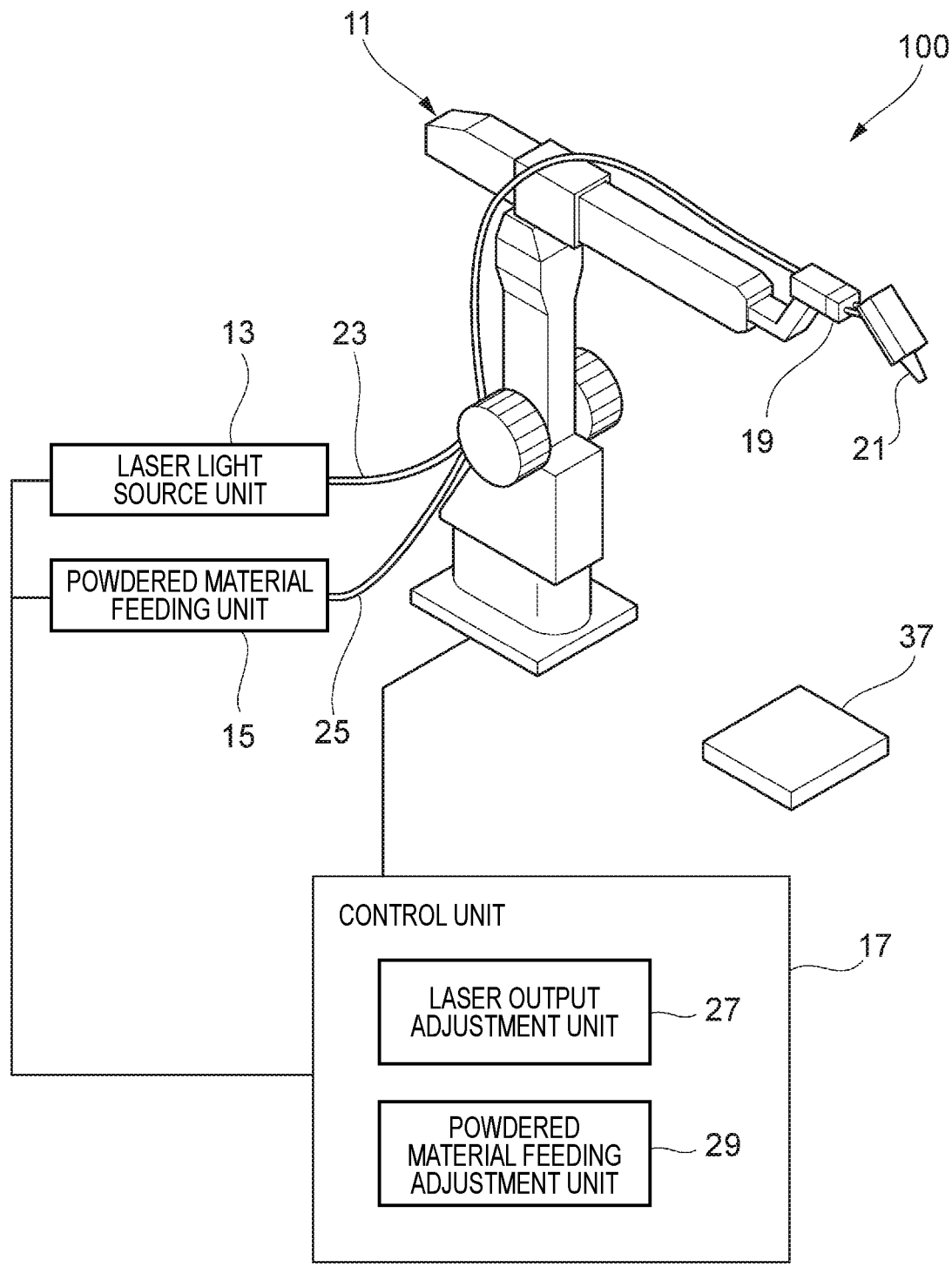
FIG. 1 is a schematic configuration diagram of a laser metal deposition apparatus for performing overlay welding.

FIG. 1 is a schematic configuration diagram of a laser metal deposition apparatus 100 for performing overlay welding.

The laser metal deposition apparatus (hereinafter, referred to as LMD apparatus) 100 includes a welding robot 11, a laser light source unit 13, a powdered material feeding unit 15, and a control unit 17.

The welding robot 11 is an articulated robot having a distal end shaft on which a weaving drive unit 19 and a welding head 21 are provided. The position and posture of the welding head 21 may be freely set three-dimensionally within a range of the degree of freedom of a robot arm. The weaving drive unit 19 causes the welding head 21 to swing in a direction intersecting a welding line.

The laser light source unit 13 supplies a laser beam to the welding head 21 through an optical fiber 23. The powdered material feeding unit 15 feeds a powdered material 39 (see FIG. 2 to be described later) for forming a cladding layer to be described later to the welding head 21 through a powder feeding pipe 25. The control unit 17 includes a laser output adjustment unit 27 that adjusts a laser output of the laser light source unit 13, and a powdered material feeding adjustment unit 29 that adjusts a feeding amount of the powdered material 39 fed by the powdered material feeding unit 15 to the welding head 21, and performs overall drive control of the units of the LMD apparatus 100.

The drive control performed by the control unit 17 is executed by a computer in accordance with a program. That is, the control unit 17 is a computer apparatus including a processor such as a CPU, a memory such as a read only memory (ROM) and a random access memory (RAM), and a storage device such as a hard disk drive (HDD) and a solid state drive (SSD). In this case, the function of each unit can be implemented by the processor executing a predetermined program stored in the memory, the storage device, or the like.

Figure 2:
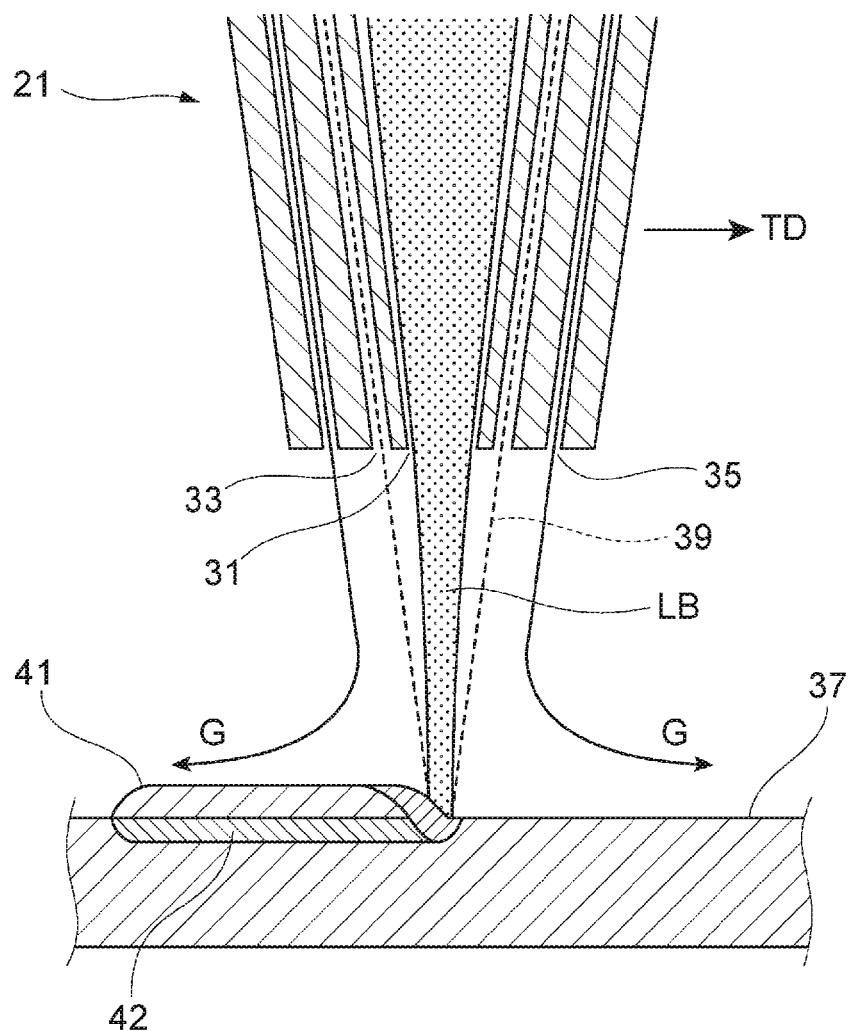
FIG. 2 is an enlarged cross-sectional view of a main part of a welding head, which shows a state in which welding is performed while moving the welding head along a welding direction.

FIG. 2 is an enlarged cross-sectional view of a main part of the welding head 21, which shows a state in which welding is performed while moving the welding head 21 along a welding direction TD.

The welding head 21 is a head for laser welding using a $CO_2$ laser, a YAG laser, a fiber laser, a disk laser, or the like, and the type of the laser is appropriately selected depending on an additively-manufactured object or the like to be manufactured.

A distal end of the welding head 21 is provided with a laser radiation port 31, a powdered material feeding port 33, and a shielding gas feeding port 35.

The laser emission port 31 is opened at a center of the distal end of the welding head 21, and a laser beam LB emitted from the laser radiation port 31 is radiated to a base metal 37. The laser beam LB is oscillated by the laser light source unit 13 and guided to the welding head 21 through the optical fiber 23. The heat input toward the weld portion, which is generated by the laser beam LB, can be controlled to be any value by adjusting the intensity of the laser beam LB by the laser output adjustment unit 27.

The powdered material feeding port 33 is concentrically opened radially outward of the laser emission port 31 at the distal end of the welding head 21, and the powdered material 39 fed from the powdered material feeding unit 15 is injected from the powdered material feeding port 33 toward the base metal 37. The feeding amount of the powdered material 39 to the base metal 37 can be controlled to be any value by the powdered material feeding unit 15.

In addition, the powdered material feeding unit 15 injects the powdered material 39 from the powdered material feeding port 33 together with a carrier gas from a carrier gas feeding unit (not shown). The powdered material 39 injected toward the base metal 37 is melted by the focused laser beam LB on a surface of the base metal 37, and then is cooled and solidified to form a cladding layer 41.

The shielding gas feeding port 35 is concentrically opened outside the powdered material feeding port 33 at the distal end of the welding head 21, and feeds a shielding gas G toward the base metal 37. The shielding gas G suppresses oxidation of the cladding layer 41 and a periphery thereof.

The configuration of the laser metal deposition apparatus 100 described above is an example, and the laser metal deposition apparatus 100 is not limited to this example.

[Powdered Material]

In the powdered material feeding unit 15, a first powder containing a precipitation hardening stainless steel alloy such as SUS630 and SUS631, or a precipitation hardening Fe alloy such as maraging steel is mechanically mixed with a second powder containing titanium carbide (hereinafter, referred to as TiC) to prepare the powdered material 39 for forming a cladding layer. The term "mechanically mixed" as used herein means stirring and mixing the powdered materials with each other without a special treatment of different kinds of powders.

In addition, the mixing of the first powder and the second powder may be performed in the powdered material feeding unit 15, or may be performed at a position different from the powdered material feeding unit 15, such as a mixer (not shown) provided in the middle of a feeding path to the welding head 21.

The powdered material 39 is obtained by mechanically mixing commercially available powders, and a complicated pretreatment for a special cladding powdered material is not necessary. In the method for manufacturing the additively-manufactured object, all the commercially available powdered materials are used as they are as the first powder and the second powder, so that the manufacturing method is excellent in economic efficiency.

The powdered material 39 used here contains the second powder (TiC) within a range of 40 mass % or more and 65 mass % or less relative to the entire powdered material 39. The lower limit of the content of the second powder is preferably 45 mass %, and more preferably 50 mass %, and the upper limit thereof is 65 mass %, preferably 63 mass %, and more preferably 60 mass %. (It should be noted that a range that can be set by freely combining any numerical value of the plurality of lower limit values and any numerical value of the plurality of upper limit values can be said to be a preferable range.)

[Base Metal]

The base metal 37 has a flat plate shape, but is not limited to a flat plate shape. A base metal having an appropriate shape, such as a plate material having a curved surface, a block body, and a tubular body, can be adopted depending on a shape of the additively-manufactured object to be manufactured. As a material of the base metal 37, in addition to steel such as stainless steel, a cobalt-based or nickel-based alloy can be used, and various materials can be adopted depending on specifications of a product and the like.

[Formation of Cladding Layer (Additively-Manufactured Object)]

The LMD apparatus 100 shown in FIG. 1 performs laser metal deposition while causing the welding head 21 to perform a weaving operation by the weaving drive unit 19 and moving the welding head 21 in the welding direction TD (FIG. 2) by the robot arm. Accordingly, the cladding layer 41 that is formed by melting and solidifying the powdered material 39 is deposited with a predetermined thickness on the base metal 37.

Figure 3:
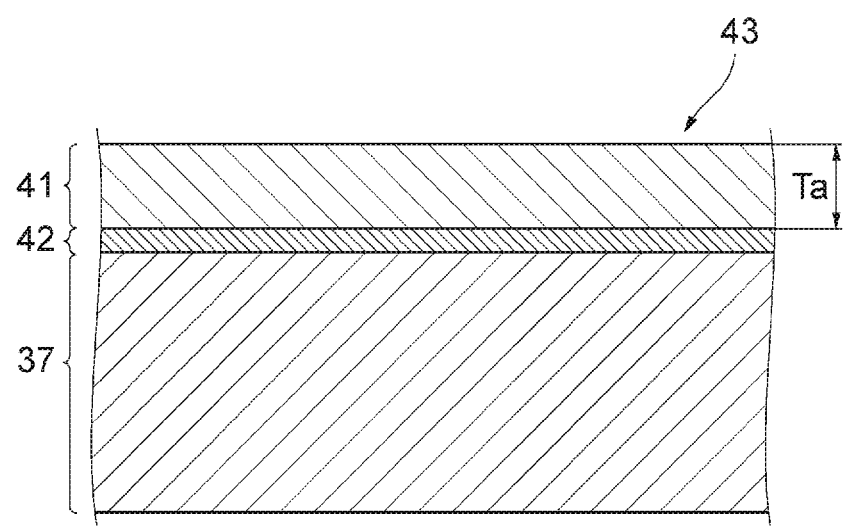
FIG. 3 is a schematic cross-sectional view of an additively-manufactured object in which a single-layer cladding layer made of a powdered material is formed on a base metal.

FIG. 3 is a schematic cross-sectional view of an additively-manufactured object 43 in which a single-layer cladding layer 41 made of the powdered material 39 is formed on the base metal 37.

The additively-manufactured object 43 includes the base metal 37 and the cladding layer 41 made of a cladding material containing precipitation hardening stainless steel and TiC. The cladding material is melted, solidified, and deposited on the base metal 37 to form the cladding layer 41. More specifically, an intermediate layer 42 obtained by dissolving a part of the base metal 37 and a part of the cladding layer 41 between each other is formed between the base metal 37 and the cladding layer 41.

Although details will be described later, regarding the cladding layer 41, a thickness T1 of a layer (a layer formed by one pass) formed at one time by one welding is 3 mm or more, preferably 3.5 mm or more, and is 5 mm or less, preferably 4.5 mm or less. In addition, the Rockwell C hardness of the cladding layer 41 is HRc 60 or more and HRc 65 or less. An occupied area ratio R1 of a TiC region in a structure observation image of the cladding layer 41 is 50 area % or more and 65 area % or less.

The surface hardness of the cladding layer 41 can be reliably set to HRc 60 or more in Rockwell C hardness by setting a content ratio of TiC in the powdered material 39 to 40 mass % or more described above.

In the additively-manufactured object 43, the cladding layer 41 having a thickness of 3 mm or more and 5 mm or less per layer (one pass) may be deposited over a plurality of layers. According to this, regarding an additively-manufactured object having a target shape, a deposited object having a large thickness can be formed by repeatedly depositing the cladding layer 41 in a plurality of passes even when the cladding layer 41 cannot be formed in one pass. Therefore, depositing with a high degree of freedom in design can be performed.

The Rockwell C hardness is an index corresponding to the content of the second powder (TiC) in the powdered material 39 used for forming the cladding layer 41. The lower limit value of the Rockwell C hardness corresponds to the lower limit value of the content of the second powder in the case where the content of the second powder of the powdered material 39 is small and the effect of increasing the hardness obtained by adding the second powder is small. In a case where the Rockwell C hardness is within the range of HRc 60~HRc 65 of the target hardness, the hardness of the cladding layer 41 significantly rises, and in addition, weld cracks during cladding can be avoided, as compared with a case where the content of the second powder is less than the lower limit value. In a case where the Rockwell C hardness exceeds the upper limit value HRc 65, weld cracks are likely to occur during cladding.

That is, by setting the ratio (also referred to as content ratio) R2 of TiC contained in the powdered material 39 within the above range, the cladding layer 41 can have an appropriate hardness (Rockwell C hardness HRc 60~HRc 65) at which weld cracks are less likely to occur.

When the occupied area ratio R1 of the TiC region in the structure observation image of the cladding layer 41 is less than 50 area %, the TiC content is small, and thus the target hardness described above is hardly achieved. In a case where the occupied area ratio R1 is 50 area % or more and 65 area % or less, weld cracks do not occur in the cladding layer 41, and the target hardness can be stably achieved. In addition, in a case where the occupied area ratio R1 exceeds 65 area %, the content of TiC becomes excessive, and weld cracks are likely to occur.

<Weaving Operation>

Next, a weaving operation of forming the cladding layer 41 will be described with reference to FIGS. 1 and 2 as appropriate.

Figure 4:
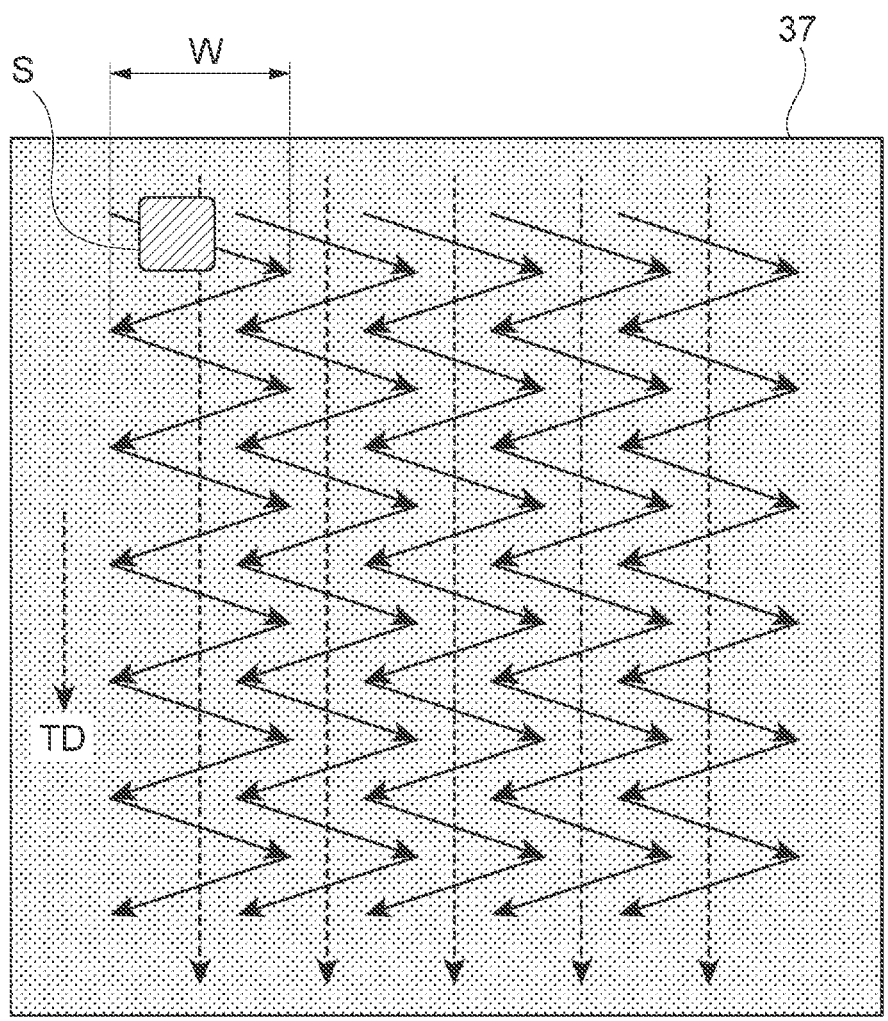
FIG. 4 is an illustration view schematically showing a state in which a cladding layer is formed by melting and solidifying a powdered material on a base metal while the welding head performs a weaving operation.

FIG. 4 is an illustration view schematically showing a state in which a cladding layer is formed by melting and solidifying the powdered material 39 on the base metal 37 while the welding head 21 performs a weaving operation.

In order to form the cladding layer 41 made of the powdered material 39 on the surface of the base metal 37, the welding head 21 performs a weaving operation, and scanning is repeatedly performed with the laser beam LB emitted from the welding head 21. Specifically, the welding head 21 is swung by the weaving drive unit 19, and scanning is performed in a predetermined width shown in FIG. 4 with the laser beam LB radiated onto the base metal 37. Here, the predetermined width is a scanning width W of a beam spot S caused by the weaving operation.

Along with the weaving operation, the robot arm of the welding robot 11 is driven to advance the welding head 21 in the welding direction TD. By the scanning with the laser beam LB and the movement of the welding head 21 in the welding direction TD, a bead is formed wide on the surface of the base metal 37 by melting and solidifying the powdered material 39. Then, the next bead adjacent to the formed bead is formed so that a part of the scanning width W overlaps the existing bead. By repeating this operation, the cladding layer 41 composed of a plurality of rows of beads is deposited on the surface of the base metal 37 without gaps.

Figure 5:
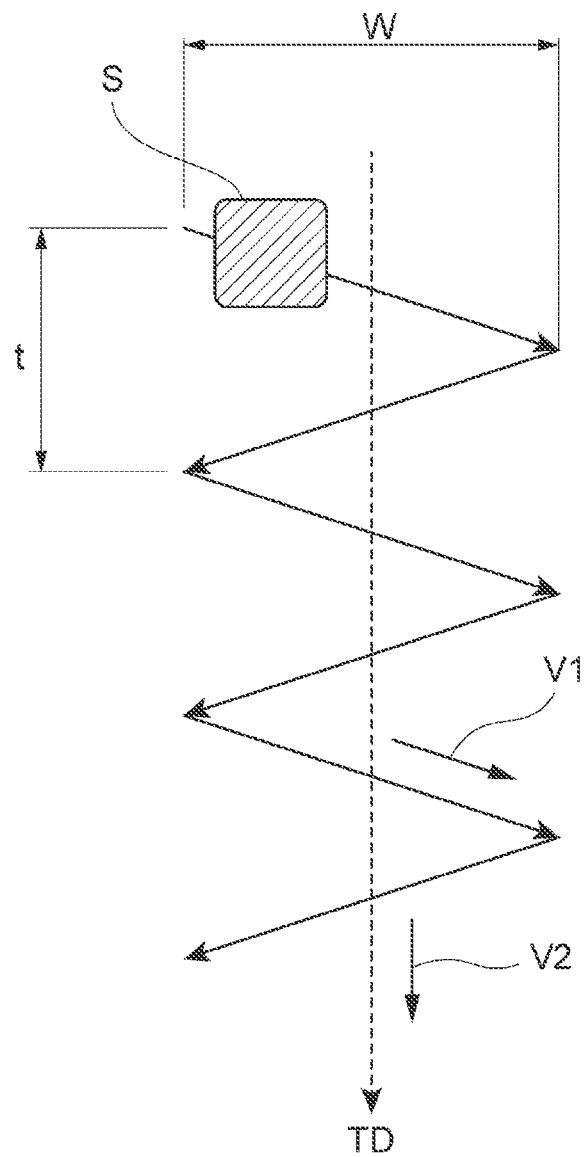
FIG. 5 is an illustration view showing conditions of the weaving operation shown in FIG. 4.

FIG. 5 is an illustration view schematically showing conditions of the weaving operation shown in FIG. 4.

The operation for depositing the cladding layer 41 includes an operation of weaving the laser beam LB with the scanning width W and an operation of advancing the welding head 21 in the welding direction TD. Here, a scanning speed of the welding head 21 in the weaving direction (scanning direction) is denoted by V1, an advancing speed (welding speed) of the welding head 21 in the welding direction TD is denoted by V2, and the time required for one cycle of the weaving operation is denoted by t.

In the step of depositing the cladding layer 41, the following conditional expressions [1], [2], and [3] are satisfied.

$$20 \leq A \leq 35 \qquad \text{Conditional Expression [1]}$$

$$1.1 \leq B \leq 1.3 \qquad \text{Conditional Expression [2]}$$

$$40 \text{ mass \%} \leq R2 \leq 65 \text{ mass \%} \qquad \text{Conditional Expression [3]}$$

Here, the parameters in the conditional expressions [1], [2], and [3] are as follows.

$A = P \times \alpha/\beta$ [kJ/cm]: Laser heat input index
$B = Q \times \alpha/\beta$ [g/cm]: Powder feeding rate index
P [W]: Heat input from laser beam
Q [g/min]: Feeding rate of powdered material
$\alpha = W/V1$
$\beta = V2 \times t$
W [cm]: Scanning width of beam spot caused by weaving operation
V1 [cm/min]: Scanning speed of laser beam caused by weaving operation
V2 [cm/min]: Advancing speed in welding direction
t [sec]: Time of one weaving cycle
R2 [mass %]: Ratio of second powder contained in powdered material The conditional expression [1] shows an appropriate range of the laser heat input index A representing the amount of heat input by the laser beam LB with which the powdered material 39 on the base metal 37 is irradiated. The laser heat input index A means laser heat input per unit welding line during the weaving welding, and satisfies $20 \leq A \leq 35$, and preferably satisfies $20 \leq A \leq 30$.

In a case where the laser heat input index A is less than 20, occurrence of results of undissolved or unmelted powdered material due to insufficient laser heat input, or occurrence of weld cracks during cladding tends to become a problem. In the case of $20 \leq A \leq 35$ (where B also satisfies the conditional expression [2]), both of the following first and second conditions are satisfied.

First condition: The Rockwell C hardness of the cladding layer 41 described above is HRc 60 or more and HRc 65 or less.

Second condition: The thickness Ta of the cladding layer 41 formed in one pass is 3 mm or more and 5 mm or less.

In a case where the laser heat input index A exceeds 35, the penetration in the base metal 37 is large due to an excessive amount of laser heat input, and the hardness of the cladding layer 41 under the first condition is less likely to reach HRc 60 or more.

The conditional expression [2] shows an appropriate range of the powder feeding index B representing the feeding rate of the powdered material 39 to be fed onto the base metal 37. The powder feeding index B means a powder feeding weight per unit welding line during weaving welding, and is $1.1 \leq B \leq 1.3$, and preferably $1.15 \leq B \leq 1.25$.

In a case where the powder feeding index B is less than 1.1, the cladding layer 41 having a thickness of 3 mm or more is hardly formed due to insufficient powder feeding. Therefore, as a result of increasing the addition amount of the TiC powder having a small specific gravity in order to maintain the thickness (volume) of the cladding layer 41, the TiC content of the cladding layer 41 becomes excessive, and weld cracks are likely to occur. Further, in the case of $1.1 \leq B \leq 1.3$ (where A also satisfies the conditional expression [1]), the above-described first and second conditions are stably satisfied. In a case where the powder feeding index B exceeds 1.3, the unmelted powder tends to remain due to excessive feeding of the powdered material. As a result of increasing the proportion of the stainless steel powder having a large specific gravity in order to perform cladding with a predetermined thickness without leaving the unmelted powder, the TiC content of the cladding layer 41 is reduced, and the target hardness is hardly achieved.

The conditional expression [3] shows an appropriate range of the ratio R2 of the second powder contained in the powdered material 39. The content ratio R2 of the second powder is a mass ratio of the second powder to the total mass of the first powder and the second powder, and satisfies 40 mass % $\leq$ R2 $\leq$ 65 mass %.

In a case where the content ratio R2 of the second powder is less than 40 mass %, the TiC content of the cladding layer 41 is reduced, and the hardness of the cladding layer 41 described above hardly reaches HRc 60 or more. In addition, in the case of 40 mass % $\leq$ R2 $\leq$ 65, the hardness significantly rises as compared with the case of less than 40 mass % described above, and the occurrence of weld cracks during cladding can be avoided. In a case where the content ratio R2 exceeds 65 mass %, the TiC content of the cladding layer 41 becomes excessive, and weld cracks are likely to occur during cladding.

<Weaving Radiation of Laser Beam>

Next, the weaving radiation action of the laser beam will be described.

In general, since a laser beam has high directivity and energy density, an inside of a region of a minute irradiation spot is intensively heated when the laser beam is radiated toward a base metal. Therefore, a keyhole is formed in the base metal depending on conditions, and heating is limited to a vicinity of the irradiation spot.

Therefore, when the laser beam LB is advanced in the welding direction, weaving is performed at a scanning speed higher than the advancing speed, so that a heating area is increased depending on the scanning range and the base metal in the scanning range is uniformly heated. The term "weaving" referred to here is a method for improving weldability by swinging a welding torch in a direction intersecting a welding line and uniformly melting both base metals in, for example, butt arc welding, but the weaving is applied to scanning with the laser beam LB in the present configuration.

In a case where welding is performed by applying weaving to the laser beam LB, the time during which a beam spot is radiated to the vicinity of a weld portion on the base metal 37 is longer than that in a case where welding is performed by moving the laser beam LB along a normal welding line (without weaving). That is, by applying weaving, the heat input in the vicinity of the weld portion can be increased, and heating for the base metal 37 can be promoted. Therefore, in a case where the laser beam LB is radiated over a wide range toward the base metal to which the powdered material 39 is fed, a temperature difference between the cladding layer 41 formed by melting and solidifying the powdered material 39 due to heat input from the laser beam LB and the surface of the base metal 37 heated by the laser beam LB is reduced, and it is possible to prevent weld cracks of the cladding layer 41 due to shrinkage strain after cooling.

Since the heat input in the vicinity of the weld portion is increased due to weaving of the laser beam LB, the feeding amount of the powdered material 39 fed during the welding can be increased, and surfacing with a large thickness per pass can be performed. In this case, the surface of the base metal 37 is thickly covered with the powdered material 39, and heat input from the laser beam LB is consumed for melting the powdered material 39. Therefore, excessive heating for the base metal 37 performed by the laser beam LB is avoided, and the penetration amount is reduced. Accordingly, the cladding layer 41 can be easily formed in a thickness on the order of several millimeters in one layer, and when the cladding layer 41 has a thickness of about 3 mm~5 mm, multilayer cladding over a plurality of times may be unnecessary. Therefore, the possibility of occurrence of weld cracks can be reduced as compared with the case where the surfacing is repeatedly performed. Further, the effects of relaxing the dimensional restriction, reducing the construction cost, and shortening the lead time can also be obtained.

As described above, by applying weaving to the laser beam LB and increasing the powder feeding amount at the same time, surfacing with a large thickness can be implemented without causing weld cracks while preventing excessive penetration in the base metal 37. In general, in the laser metal deposition, input energy generated by the laser beam LB is used for the melting of a fed powdered material and direct heating of a base metal. When the ranges of the conditional expressions [1]~[3] described above are satisfied, most of the heat input from the laser beam LB is consumed for melting the powdered material 39, and excessive heating of the base metal 37 is prevented. The base metal 37 is also heated by the thermal energy of the melted powdered material 39 itself, so that the occurrence of weld cracks can also be reduced from this point. That is, in the above-described conditional expressions [1]~[3], the balance among the action of preventing excessive penetration in the base metal 37, the action of preventing the occurrence of weld cracks, and the action of setting the thickness of the cladding layer 41 to the order of several millimeters is appropriately adjusted.

For example, in a case where weaving is applied to the laser beam while the feeding amount of the powdered material is small, the laser beam is directly radiated to the base metal, and most of the input energy is consumed for heating the base metal 37. As a result, the penetration amount of the base metal 37 increases, and the cladding layer 41 is diluted, resulting in reduction in the hardness. In this case, the weld cracks of the cladding layer 41 can be avoided, but the cladding layer 41 remains thin, and cladding on the order of several millimeters cannot be performed.

A step of forming the cladding layer 41 by weaving of the laser beam LB is not limited to the step of moving the welding head 21 shown in FIG. 1 by the robot arm of the welding robot 11 while weaving the welding head 21. For example, the laser beam LB may be of a tandem beam type, and the roles of melting and cladding of the powdered material 39 and heating of the base metal 37 may be separately performed. In addition, for heating the base metal 37, a heating device that performs heating by burner heating, high-frequency conduction heating, or the like may be used in combination. In this case, the scanning range of weaving is reduced, the advancing speed in the welding direction TD is improved, and the tact time can be shortened.

EXAMPLES

The laser metal deposition apparatus 100 shown in FIG. 1 was used to perform overlay welding on the base metal 37 of steel (SS400). The size of the base metal 37 is 50 mm in length×50 mm in width×20 mm in thickness. A powder of SUS316L or SUS630 was used as the first powder, and a TiC powder was used as the second powder to form a single cladding layer on the entire surface of the base metal 37. Various conditions and results of the cladding formation of test pieces are shown in Table 1.

In Test Examples 1-1~4, SUS316L was used as a first powder of a powdered material, TiC was used as a second powder, and the powder feeding index B and a content of the second powder (TiC) in the powdered material were changed while maintaining the laser heat input index A at a constant value of 21.9 [kJ/cm].

In Test Examples 2-1~6, SUS630 that was a precipitation hardening stainless steel alloy was used as a first powder of a powdered material, TiC was used as a second powder, and the powder feeding index B and a content of the second powder (TiC) in the powdered material were changed while maintaining the laser heat input index A at a constant value of 21.4 [kJ/cm].

For Test Examples, the presence or absence of weld cracks in the cladding layer was checked by penetrant testing (PT), and the case of no weld cracks was evaluated as "○", and the case of presence of a weld crack was evaluated as "x".

The Rockwell C hardness of the cladding layer was measured by using a Rockwell hardness tester (using C scale) on an outer layer of a surface that was subjected to scalping to reach a depth of 3 mm from a surface of a cladding layer formed by cladding on a base metal. Five points on the outer layer of the surface were set as measurement points, and an average value of measurement values at the respective measurement points was set as a representative value of the Rockwell C hardness in the cladding layer. Table 2 shows the results of hardness measurement at five points of a test piece in each test example.

TABLE 1

Welding condition and result

| Case | Material of first powder | Material of second powder | Heat input index A [kJ/cm] | Powder feeding index B [g/cm] | Content ratio R2 of second powder [mass %] | Weld crack | Rockwell C hardness HRc | Determination |
|---|---|---|---|---|---|---|---|---|
| Test Example 1-1 | SUS316L | TiC | 21.9 | 1.57 | 28.0 | ○ | 42.6 | x |
| Test Example 1-2 | SUS316L | TiC | 21.9 | 1.43 | 36.6 | ○ | 47.7 | x |
| Test Example 1-3 | SUS316L | TiC | 21.9 | 1.28 | 47.1 | ○ | 52.7 | x |
| Test Example 1-4 | SUS316L | TiC | 21.9 | 1.14 | 60.2 | x | 60.1 | x |
| Test Example 2-1 | SUS630 | TiC | 21.4 | 1.48 | 29.8 | ○ | 58.4 | x |
| Test Example 2-2 | SUS630 | TiC | 21.4 | 1.36 | 38.8 | ○ | 57.4 | x |
| Test Example 2-3 | SUS630 | TiC | 21.4 | 1.24 | 49.5 | ○ | 60.1 | ○ |
| Test Example 2-4 | SUS630 | TiC | 21.4 | 1.12 | 62.5 | ○ | 64.9 | ○ |
| Test Example 2-5 | SUS630 | TiC | 21.4 | 1.07 | 70.1 | x | 70.4 | x |
| Test Example 2-6 | SUS630 | TiC | 21.4 | 1.09 | 80.3 | x | 70.7 | x |

TABLE 2

Hardness test result of test pieces

Rockwell C hardness (HRc) at position of 3 mm from cladding layer surface

| Case | N1 | N2 | N3 | N4 | N5 | Average |
|---|---|---|---|---|---|---|
| Test Example 1-1 | 49.3 | 43.4 | 40.6 | 38.3 | 41.5 | 42.6 |
| Test Example 1-2 | 45.5 | 50.0 | 47.4 | 47.3 | 48.2 | 47.7 |
| Test Example 1-3 | 52.7 | 51.1 | 52.0 | 54.3 | 53.5 | 52.7 |
| Test Example 1-4 | 61.9 | 57.6 | 58.9 | 61.0 | 61.3 | 60.1 |
| Test Example 2-1 | 58.5 | 56.9 | 58.8 | 60.3 | 57.5 | 58.4 |
| Test Example 2-2 | 60.3 | 59.0 | 57.1 | 54.8 | 56.0 | 57.4 |

TABLE 2-continued

Hardness test result of test pieces

Rockwell C hardness (HRc) at position of 3 mm from cladding layer surface

| Case | N1 | N2 | N3 | N4 | N5 | Average |
|---|---|---|---|---|---|---|
| Test Example 2-3 | 58.5 | 59.6 | 62.1 | 61.4 | 58.7 | 60.1 |
| Test Example 2-4 | 66.2 | 67.4 | 65.4 | 65.1 | 60.6 | 64.9 |
| Test Example 2-5 | 70.6 | 69.2 | 70.9 | 69.4 | 72.0 | 70.4 |
| Test Example 2-6 | 67.7 | 71.1 | 75.1 | 72.3 | 67.1 | 70.7 |

Figure 6:
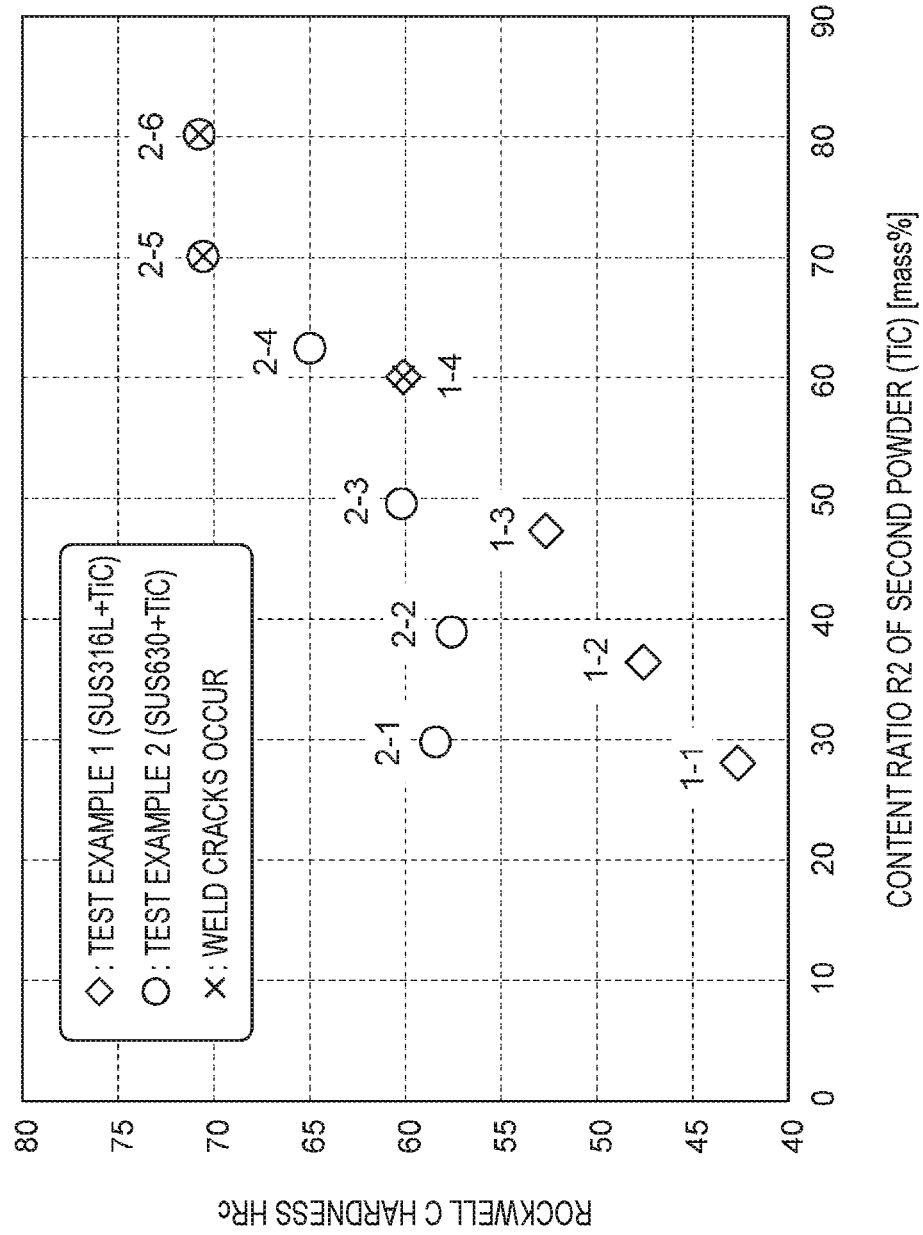
FIG. 6 is a graph showing a relation between a content ratio of a second powder and the Rockwell C hardness of a cladding layer in each Test Example.

FIG. 6 is a graph showing a relation between the content ratio R2 of the second powder (TiC) and the Rockwell C hardness of the cladding layer in each test example.

In a case where the content ratio of the second powder (TiC) was raised to about 60 mass % in the case where SUS316L was used as the first powder in Test Examples 1-1~4, weld cracks occurred although the surface hardness was HRc 60 or more (Test Example 1-4).

On the other hand, in a case where SUS630 was used as the first powder in Test Examples 2-1~6, the surface hardness was HRc 60 or more when the content ratio of the second powder (TiC) was about 40 mass %~50 mass % (Test Examples 2-3 and 2-4). In a case where the content ratio of the second powder (TiC) was raised to exceed 70 wt %, weld cracks occurred (Test Examples 2-5 and 2-6).

From the above, it was found that, when SUS630 was used as the first powder and the content ratio R2 of the second powder (TiC) was 40 mass % or more and 65 mass % or less, it is possible to form a cladding layer having a surface hardness of HRc 60 or more and HRc 65 or less and a thickness per pass on the order of several millimeters (3 mm in the present Test Example) in a state in which weld cracks do not occur. When the thickness of the cladding layer per pass exceeds 5 mm, it is empirically predicted that the surface hardness does not fall within the above range or weld cracks occur. Therefore, it can be assumed that the surface hardness of the cladding layer per pass can be set in the above range and weld cracks do not occur when the thickness of the cladding layer per pass is up to 5 mm.

Next, surfaces at a position with a depth of 3 mm relative to the cladding layers formed under the conditions in Test Examples 2-1~6 were subjected to structure observation using a scanning electron microscope. Then, the proportion (occupancy) of a black portion (TiC region) in the obtained SEM image was determined by image analysis.

A procedure from the structure observation to the image analysis is as follows.

(1) Mirror polishing of surface
(2) SEM observation (magnification×50)
(3) Identification of black portion (TiC region) based on binarization of SEM image
(4) Calculation of occupied area ratio R1 of black portion (TiC region)

Figure 7:
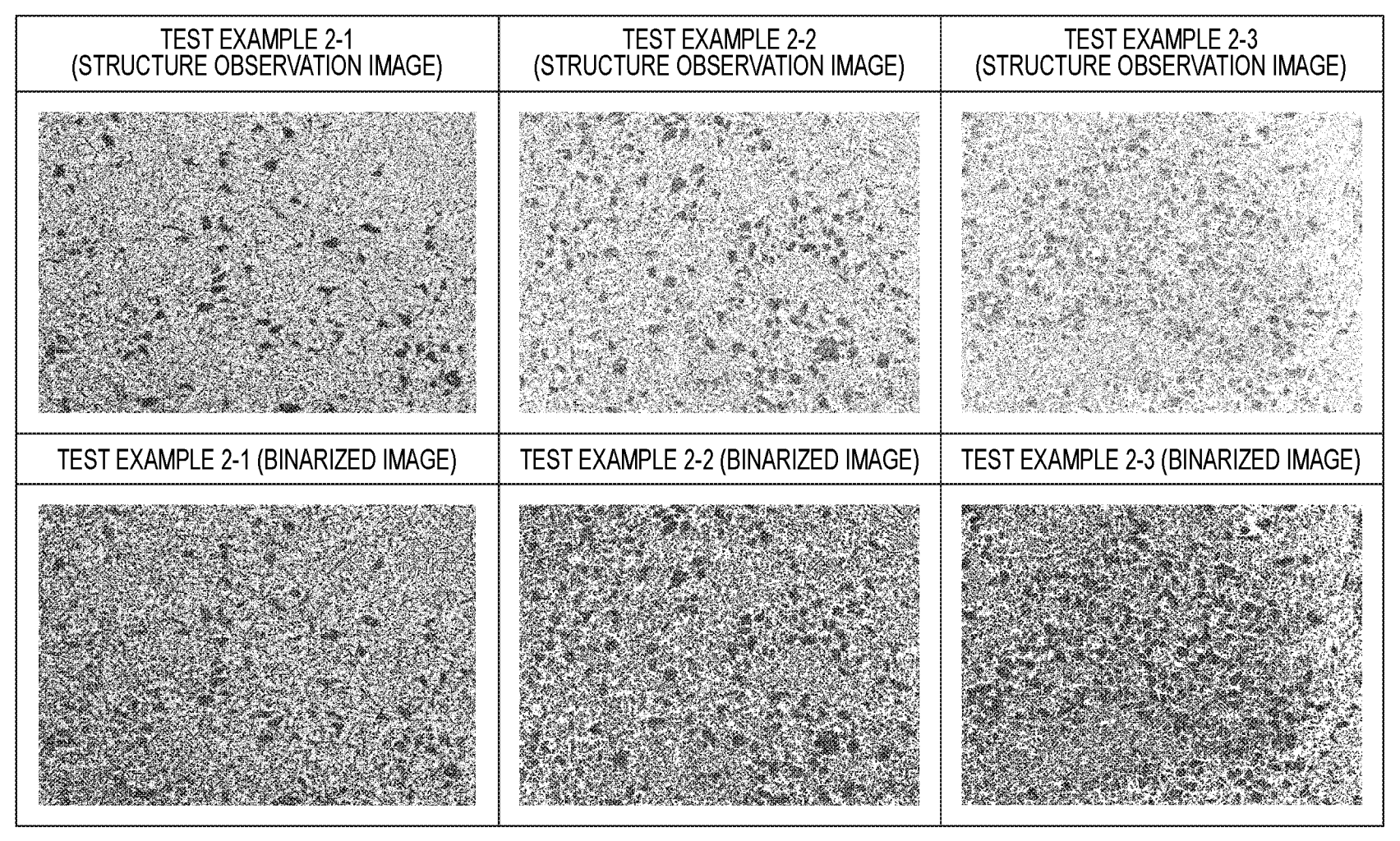
Figure 8:
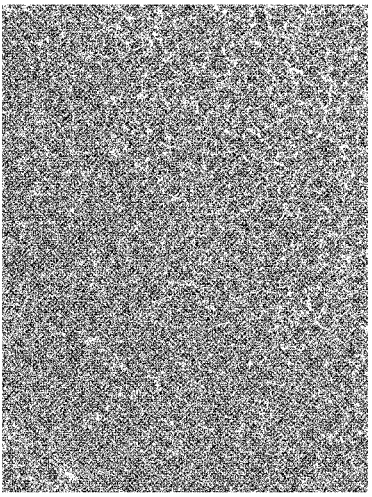
FIG. 8 is an illustration view showing a structure observation image (upper part) and a binarized image (lower part) of a cladding layer in Test Examples 2-4~6.

FIG. 7 is an illustration view showing a structure observation image (upper part) and a binarized image (lower part) of a cladding layer in Test Examples 2-1~3. FIG. 8 is an illustration view showing a structure observation image (upper part) and a binarized image (lower part) of a cladding layer in Test Examples 2-4~6. In addition, Table 3 shows the occupied area ratio of a TiC region together with the content ratio R2 of the second powder (TiC) and the values of the Rockwell C hardness. Here, as the setting of a threshold value for binarization, for example, an appropriate method of adjusting and setting a threshold value at which an edge of a TiC region in the SEM image is most approximate for each observation field of view can be adopted.

TABLE 3

Calculation results of occupied area ratio of titanium carbide (TiC) region

| Case | Content ratio R2 of second powder (TiC) [mass %] | Occupied area ratio R1 of TiC region [area %] | Rockwell C hardness HRc |
|---|---|---|---|
| Test Example 2-1 | 29.8 | 32.5 | 58.4 |
| Test Example 2-2 | 38.8 | 46.0 | 57.4 |
| Test Example 2-3 | 49.5 | 51.8 | 60.1 |
| Test Example 2-4 | 62.5 | 64.8 | 64.9 |
| Test Example 2-5 | 70.1 | 74.8 | 70.4 |
| Test Example 2-6 | 80.3 | 82.5 | 70.7 |

From these results, it was found that the surface hardness was HRc 60 or more and HRc 65 or less in a case where the occupied area ratio R1 of the black portion (TiC region) in the binary image was 50 area % or more and 65 area % or less (Test Examples 2-3 and 2-4).

Figure 9:
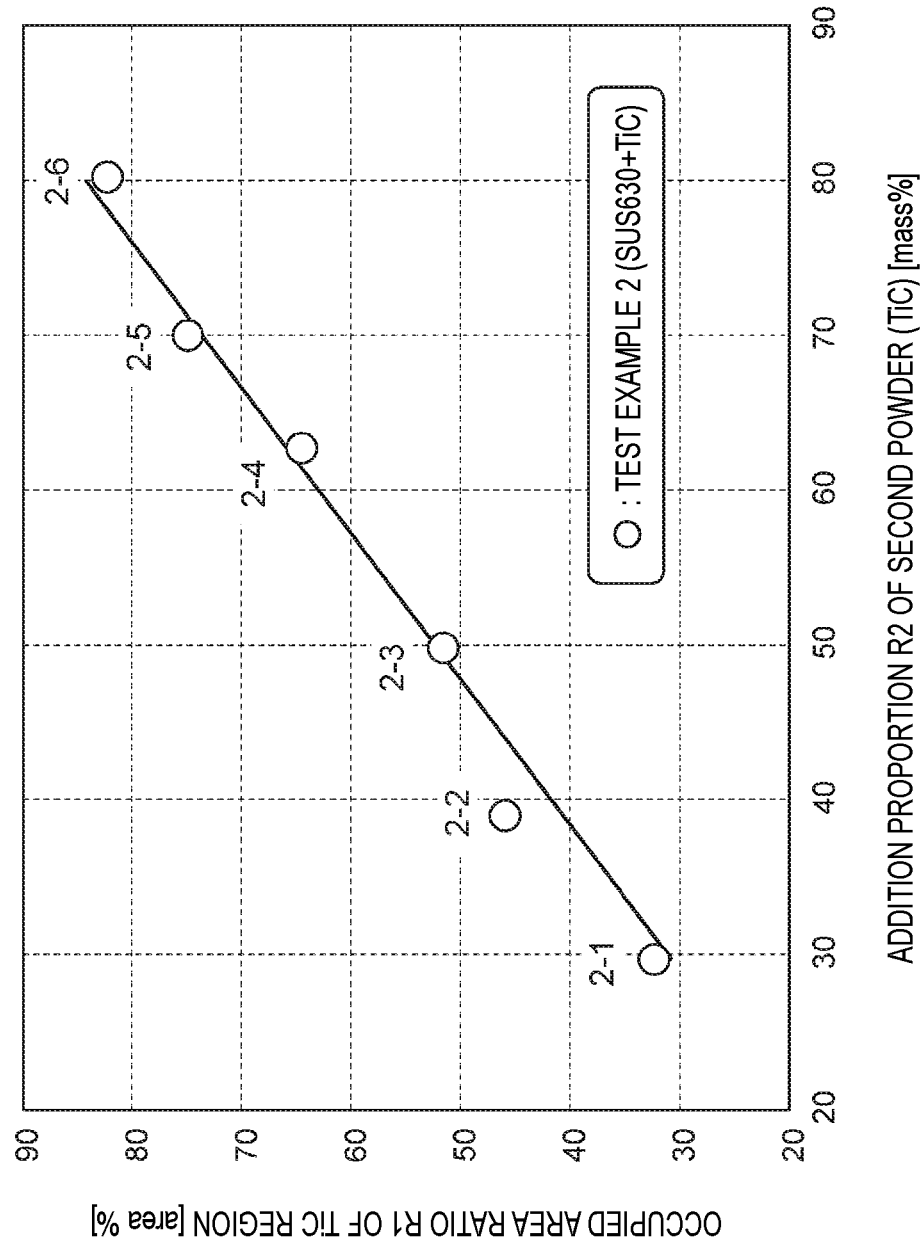
FIG. 9 is a graph showing a relation between a content ratio of the second powder in powdered materials of Test Examples 2-1~6 and an occupied area ratio R1 of the TiC region contained in the cladding layer.

FIG. 9 is a graph showing a relation between the content ratio R2 of the second powder (TiC) in the powdered materials of Test Examples 2-1~6 and the occupied area ratio R1 of the TiC region contained in the cladding layer.

It can be found that the occupied area ratio R1 of the TiC region increases in proportion to an increase in the addition amount of the second powder (TiC).

Figure 10:
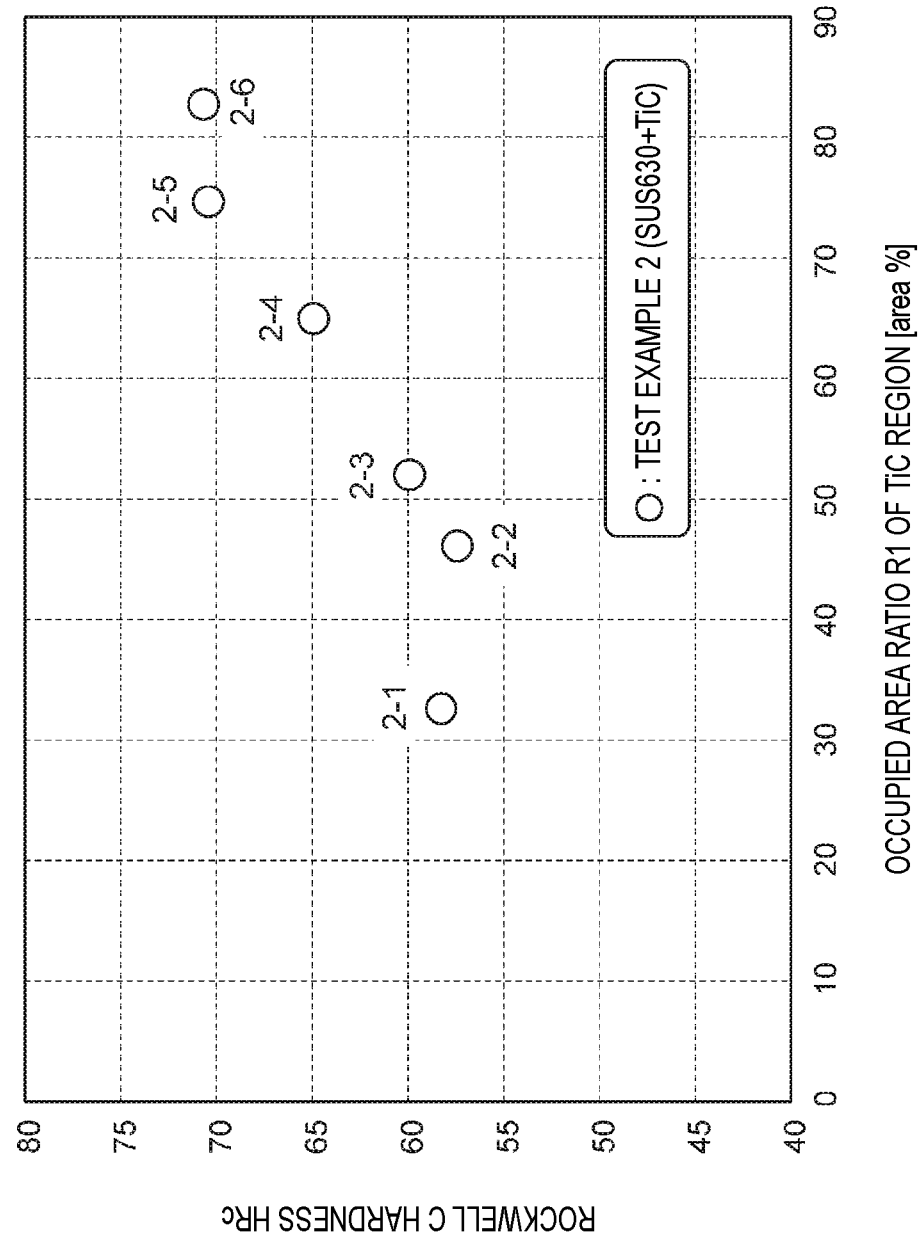
FIG. 10 is a graph showing a relation between the occupied area ratio of a TiC region contained in a cladding layer of Test Examples 2-1~6 and the Rockwell C hardness.

FIG. 10 is a graph showing a relation between the occupied area ratio R1 of a TiC region contained in a cladding layer of Test Examples 2-1~6 and the Rockwell C hardness.

As for the distribution of the Rockwell C hardness, Test Examples 2-3 and 2-4 fall within a range of about HRc 60 or more and HRc 65 or less relative to the occupied area ratio R1 of the TiC region, similarly to the relation with the addition amount of the second powder (TiC) shown in FIG. 6.

The upper limit of the laser heat input index A shown in Table 1 was confirmed by laser cure cladding using a mixed powder of a stellite alloy (No. 1, manufactured by Kennametal Stellite) and tungsten carbide (tungsten carbide powder, product name: 4670, manufactured by Hoganas), although the materials were different. As a result, when a value of the laser heat input index A in the weaving welding condition exceeded 35 [kJ/cm], a penetration depth into the base metal was as deep as 2 mm or more, and a dilution ratio of the cladding layer was increased, so that the hardness was significantly reduced. From this, it is presumed that even in the case of a mixed powder of precipitation hardening stainless steel and TiC, the laser heat input index A is desirably 35 [kJ/cm] or less.

In the results of the determination columns shown in Table 1, the case where there was no weld crack, the Rockwell C hardness was HRc 60 or more and HRc 65 or less, and the occupied area ratio R1 of the TiC region is 50 area % or more and 65 area % or less was evaluated as "○", and the other cases are evaluated as "x". The thickness of each cladding layer per pass was 3 mm or more and 5 mm or less.

As described above, as in Test Examples 2-3 and 2-4, by setting the conditions satisfying the above-described conditional expressions [1]~[3], a high-quality additively-manufactured object which has a hardness (Rockwell C hardness of HRc 60 or more and HRc 65 or less) at which high wear resistance can be obtained without causing weld cracks and which has a cladding layer thickness per pass of 3 mm or more and 5 mm or less was stably obtained.

The present invention is not limited to the above embodiments, and combinations of the respective configurations of the embodiments, or changes and applications made by those skilled in the art based on the description of the specification and the well-known technology are also intended by the present invention and are included within the scope to be protected.

As described above, the following matters are disclosed in the present specification.

(1) A method for manufacturing an additively-manufactured object, the method including:

radiating a laser beam in a weaving manner to a powdered material containing a first powder containing precipitation hardening stainless steel and a second powder containing titanium carbide to melt and solidify the powdered material; and depositing at least one layer of a cladding layer on a base metal, wherein the step of depositing the cladding layer is a step satisfying the following conditional expressions [1], [2], and [3]:

$20 \le A \le 35$        Conditional Expression [1];

$1.1 \le B \le 1.3$        Conditional Expression [2]; and 40 mass % $\le R2 \le$ 65 mass %        Conditional Expression [3], where $A = P \times \alpha/\beta$ [kJ/cm]: Laser heat input index,
$B = Q \times \alpha/\beta$ [g/cm]: Powder feeding rate index,
P [W]: Heat input from laser beam,
Q [g/min]: Feeding rate of powdered material,
$\alpha = W/V1$,
$\beta = V2 \times t$, W [cm]: Scanning width of beam spot caused by weaving operation,
V1 [cm/min]: Scanning speed of laser beam caused by weaving operation,
V2 [cm/min]: Advancing speed in welding direction,
t [sec]: Time of one weaving cycle, and
R2 [mass %]: Ratio of second powder contained in powdered material.

According to the method for manufacturing an additively-manufactured object, the heat input in the vicinity of the weld portion of the base metal can be increased by weaving of the laser beam, and the heating of the base metal can be promoted. Therefore, the temperature difference between the cladding layer formed by melting and solidifying the powdered material due to the heat input from the laser beam and the surface of the base metal heated by the laser beam is reduced, and the weld crack of the cladding layer due to the shrinkage strain after cooling can be prevented.

Since the heat input in the vicinity of the weld portion is increased due to weaving of the laser beam, the feeding amount of the powdered material fed during the welding can be increased, and surfacing with a large thickness per pass can be performed.

Then, in a state in which the penetration (the formation range of the intermediate layer having an intermediate hardness between the base metal and the cladding layer) is small, a cladding layer on the order of several millimeters per layer can be formed. As a result, it is not necessary to perform multilayer welding in order to ensure the thickness of a cladding layer as in the related art, and the possibility of occurrence of weld cracks during processing can be reduced. Further, the effects of relaxing the dimensional restriction, reducing the construction cost, and shortening the lead time can also be obtained.

In addition, a powdered material obtained by mixing generally commercially available powders such as precipitation hardening stainless steel and titanium carbide is used, so that it is not necessary to use a powdered material for cladding, which requires a complicated pretreatment, and a high-quality cladding layer excellent in the economic efficiency can be formed.

(2) The method for manufacturing an additively-manufactured object according to (1), wherein the cladding layer is deposited over a plurality of times.

According to the method for manufacturing an additively-manufactured object, the object can be manufactured into any target shape, and the degree of freedom in design is improved.

(3) An additively-manufactured object including:

a base metal; and at least one layer of a cladding layer formed on the base metal, the cladding layer containing a precipitation hardening stainless steel alloy and titanium carbide, wherein the cladding layer has a thickness of 3 mm or more and 5 mm or less per layer, and a Rockwell C hardness of HRc 60 or more and HRc 65 or less, and an occupied area ratio R1 of a titanium carbide region in a structure observation image of the cladding layer is 50 area % or more and 65 area % or less.

The additively-manufactured object has high hardness and a high quality without weld cracks, so that the range of application to a product can be expanded.

(4) The additively-manufactured object according to (3), wherein the precipitation hardening stainless steel alloy is an SUS630 alloy.

The additively-manufactured object can have a configuration having higher strength and excellent corrosion resistance, for example, as compared with a case where an austenitic stainless steel alloy is used.

(5) The additively-manufactured object according to (3) or (4), wherein a plurality of the cladding layer are deposited on the base metal.

The additively-manufactured object can be formed into any shape with a high hardness and can have a high quality without weld cracks.

The present application is based on a Japanese patent application (No. 2020-43356) filed on Mar. 12, 2020, contents of which are incorporated herein by reference.

REFERENCE SIGNS LIST

11 Welding robot
13 Laser light source unit
15 Powdered material feeding unit
17 Control unit
19 Weaving drive unit
21 Welding head
23 Optical fiber
25 Powder feeding pipe
27 Laser output adjustment unit
29 Powdered material feeding adjustment unit
31 Laser radiation port
33 Powdered material feeding port
35 Shielding gas feeding port
37 Base metal
39 Powdered material
41 Cladding layer
42 Intermediate layer
43 Additively-manufactured object
100 Laser metal deposition apparatus

The invention claimed is:

1. A method for manufacturing an additively-manufactured object, the method comprising:
radiating a laser beam in a weaving manner to a powdered material containing a first powder containing precipitation hardening stainless steel and a second powder containing titanium carbide to melt and solidify the powdered material; and
depositing at least one layer of a cladding layer on a base metal,
wherein the step of depositing the cladding layer is a step satisfying the following conditional expressions [1], [2], and [3]:

$20 \leq A \leq 35$  Conditional Expression [1];

$1.1 \leq B \leq 1.3$  Conditional Expression [2]; and $40 \text{ mass } \% \leq R2 \leq 65 \text{ mass } \%$  Conditional Expression [3], where $A = P \times \alpha / \beta$ [KJ/cm]: Laser heat input index,
$B = Q \times \alpha / \beta$ [g/cm]: Powder feeding rate index,
P [W]: Heat input from laser beam,
Q [g/min]: Feeding rate of powdered material,
$\alpha = W/V1$,
$\beta = V2 \times t$,
W [cm]: Scanning width of beam spot caused by weaving operation,
V1 [cm/min]: Scanning speed of laser beam caused by weaving operation,
V2 [cm/min]: Advancing speed in welding direction,
t [sec]: Time of one weaving cycle, and
R2 [mass %]: Ratio of second powder contained in powdered material.

2. The method for manufacturing an additively-manufactured object according to claim 1,
wherein the cladding layer is deposited over a plurality of times.

3. An additively-manufactured object comprising:
a base metal; and
at least one layer of a cladding layer formed on the base metal, the cladding layer containing a precipitation hardening stainless steel alloy and titanium carbide,
wherein the cladding layer has a thickness of 3 mm or more and 5 mm or less per layer, and a Rockwell C hardness of HRc 60 or more and HRc 65 or less, and
an occupied area ratio R1 of a titanium carbide region in a structure observation image of the cladding layer is 50 area % or more and 65 area % or less.

4. The additively-manufactured object according to claim 3,
wherein the precipitation hardening stainless steel alloy is an SUS630 alloy.

5. The additively-manufactured object according to claim 3 or 4,
wherein a plurality of the cladding layer are deposited on the base metal.

* * * * *